United States Patent
Reim et al.

(10) Patent No.: US 11,599,521 B2
(45) Date of Patent: Mar. 7, 2023

(54) SYSTEMS AND METHODS FOR PROVIDING REAL-TIME DISCREPANCIES BETWEEN DISPARATE EXECUTION PLATFORMS

(71) Applicant: Zeta Global Corp., New York, NY (US)

(72) Inventors: John Reim, New York, NY (US); Sriram Eswaran, East Brunswick, NJ (US); Ashley Herzog Kirchgessner, Brooklyn, NY (US); Jaisimha Muthegere, Bangalore (IN)

(73) Assignee: Zeta Global Corp., New York, NY (US)

( * ) Notice: Subject to any disclaimer, the term of this patent is extended or adjusted under 35 U.S.C. 154(b) by 5 days.

(21) Appl. No.: 15/988,818

(22) Filed: May 24, 2018

(65) Prior Publication Data
US 2018/0341673 A1  Nov. 29, 2018

Related U.S. Application Data

(60) Provisional application No. 62/510,882, filed on May 25, 2017.

(51) Int. Cl.
*G06F 16/23* (2019.01)
*G06F 16/27* (2019.01)
(Continued)

(52) U.S. Cl.
CPC ........ *G06F 16/2365* (2019.01); *G06F 16/215* (2019.01); *G06F 16/27* (2019.01);
(Continued)

(58) Field of Classification Search
CPC .... G06F 16/2365; G06F 16/27; G06F 16/907; G06F 16/904; G06F 16/215; G06F 16/9566
(Continued)

(56) References Cited

U.S. PATENT DOCUMENTS 6,473,502 B1 * 10/2002 Karau ............... H04M 3/42144
379/221.13
8,544,033 B1 * 9/2013 Acharya ................. H04H 60/33
725/12
(Continued)

FOREIGN PATENT DOCUMENTS

WO   WO-2018218058 A1   11/2018
WO   WO-2018218059 A2   11/2018

OTHER PUBLICATIONS

"U.S. Appl. No. 15/988,850, Preliminary Amendment filed Nov. 12, 2019", 8 pgs.
(Continued)

*Primary Examiner* — Giovanna B Colan
(74) *Attorney, Agent, or Firm* — Schwegman Lundberg & Woessner, P.A.

(57) ABSTRACT

In accordance with embodiments of the present disclosure, each third party system of multiple third party systems can store files including datasets associated with one or more campaigns. A computing system can be in communication with the third party systems and including a first database and a second database. The computing system can be configured to receive the selection of the one or more third-party systems, store metadata associated with the at least one campaign in the first database, calculate at least one discrepant data value between the one or more third party systems, based on the datasets associated with the at least one campaign from each of the one or more third party systems.

20 Claims, 9 Drawing Sheets

(51) Int. Cl.
*G06F 16/904* (2019.01)
*G06F 16/907* (2019.01)
*G06F 16/955* (2019.01)
*G06F 16/215* (2019.01)

(52) U.S. Cl.
CPC .......... *G06F 16/904* (2019.01); *G06F 16/907* (2019.01); *G06F 16/9566* (2019.01)

(58) Field of Classification Search
USPC ....................................................... 707/690
See application file for complete search history.

(56) References Cited

U.S. PATENT DOCUMENTS

| | | | | |
|---|---|---|---|---|
| 8,792,912 | B2* | 7/2014 | Gits | H04W 4/023 |
| | | | | 455/456.3 |
| 9,135,352 | B2* | 9/2015 | Kanakarajan | H04L 67/2819 |
| 9,444,839 | B1* | 9/2016 | Faulkner | H04L 67/146 |
| 9,489,271 | B1* | 11/2016 | Tsaur | G06F 16/22 |
| 2003/0088562 | A1 | 5/2003 | Dillon et al. | |
| 2005/0222975 | A1* | 10/2005 | Nayak | G06F 16/338 |
| 2006/0143084 | A1 | 6/2006 | Donnelli et al. | |
| 2006/0143239 | A1* | 6/2006 | Battat | G06F 16/2365 |
| 2007/0130263 | A1* | 6/2007 | Li | G06Q 10/107 |
| | | | | 709/206 |
| 2007/0261073 | A1 | 11/2007 | Blumenschein et al. | |
| 2008/0250033 | A1 | 10/2008 | Agarwal et al. | |
| 2012/0072950 | A1* | 3/2012 | Wu | H04N 21/812 |
| | | | | 725/35 |
| 2015/0019497 | A1* | 1/2015 | Bostock | G06F 11/0748 |
| | | | | 707/687 |
| 2015/0081389 | A1* | 3/2015 | Dereszynski | G06Q 30/0204 |
| | | | | 705/7.33 |
| 2015/0261824 | A1* | 9/2015 | Jha | G06F 16/951 |
| | | | | 707/690 |
| 2017/0098234 | A1 | 4/2017 | Carlson et al. | |
| 2017/0132658 | A1 | 5/2017 | Luo et al. | |
| 2017/0293864 | A1 | 10/2017 | Oh et al. | |
| 2018/0225707 | A1* | 8/2018 | Hudson | G06Q 30/0276 |
| 2018/0341989 | A1 | 11/2018 | Reim et al. | |

OTHER PUBLICATIONS

"International Application Serial No. PCT/US2018/034450, International Search Report dated Aug. 13, 2018", 2 pgs.

"International Application Serial No. PCT/US2018/034450, Written Opinion dated Aug. 13, 2018", 9 pgs.

"International Application Serial No. PCT/US2018/34453, International Search Report dated Aug. 13, 2018", 2 pgs.

* cited by examiner

SYSTEMS AND METHODS FOR PROVIDING REAL-TIME DISCREPANCIES BETWEEN DISPARATE EXECUTION PLATFORMS

CROSS-REFERENCE TO RELATED PATENT APPLICATIONS

This application claims priority to U.S. Provisional Application No. 62/510,882 filed on May 25, 2017, the content of which is hereby incorporated by reference in its entirety.

BACKGROUND

Executing and tracking digital media campaigns can be a cumbersome and error-prone process. Multiple vendors can track delivery of digital media campaigns for billing purposes. These vendors can include, for example, ad servers, execution platforms, and measurement platforms. Each of these vendors have their own mechanism for tracking delivery of any given digital media campaign. As a result, discrepancies between systems can be common and a burden to manage. These discrepancies can cause many problems, including for example: 1) uncertainty of campaign pacing and delivery; and 2) dispute over billing records. Existing techniques for managing such discrepancies are, in general, manual, time-consuming, cumbersome, and inaccurate.

SUMMARY

According to various embodiments, a system, method and computer readable medium are provided for automatically generating a report that displays delivery data from each of a number of relevant partners (i.e., vendors) included within a media buy (such as an ad server, execution platform, and measurement platform). The report can be embodied as a discrepancy report. The Discrepancy Report provides discrepancy management for members of services, operations and billing departments. The generated discrepancy report lists delivery figures side-by-side, along with an indication of the calculated discrepant figure between the vendors. The discrepant value can be automatically calculated based on the billable system of record. The discrepancy report can include reporting data for each vendor relevant to a particular digital media campaign, and includes data at the line level for easy analysis. The discrepancy report can include a calculation of the rate of discrepancy, making it easy for a user to quickly identify issues.

In accordance with embodiments of the present disclosure, each third party system of multiple third party systems can store a files including datasets associated with one or more campaigns. A computing system can be in communication with the third party systems and includes a first database and a second database. A user device including a display can be in communication with the computing system. The user device can be configured to transmit a selection of one or more third-party systems to the computing system. Each of the one more third-party systems is configured to store one or more files including datasets associated with at least one campaign. The computing system can be configured to receive the selection of the one or more third-party systems, store metadata associated with the at least one campaign in the first database, generate a workflow for each third-party systems of the one or more third party systems, stream the one or more files including the datasets associated with the at least one campaign from each of the one or more third party systems, via each respective workflow, store the datasets associated with the at least one campaign from each of the one or more third party systems in the second database, calculate at least one discrepant data value between the one or more third party systems, based on the datasets associated with the at least one campaign from each of the one or more third party systems, and generate a graphical user interface including a report indicating the datasets associated with the at least one campaign from each third party system of the one or more third party systems and the at least one discrepant data value between the third party systems.

The graphical user interface is rendered on the display of the user device. The datasets included in the plurality of files further includes one or more types of datum. A streaming platform residing on the computing system can be configured to stream each of the one or more files to at least one topic of a plurality of topics based on the one or more types of datum in the datasets included in the one or more files.

The computing system can be further configured to breakdown the datasets from the one or more files, filter the datasets, tokenize the datasets, and normalize the datasets. The computing system can be further configured to apply one or more tags to each of the third-party systems and generate one or more unique transaction IDs based on based on the one or more tags applied to each of the third-party systems, associate the one or more transaction IDs with the datasets. Tokenizing datasets can include joining the datasets based on the one or more transaction IDs. Filtering the datasets can include removing at least one dataset associated with an invalid transaction ID.

The one or more files can include datasets associated with events. The computing system is further configured to capture a Uniform Resource Locator (URL) associated with the events of the datasets from the at least one of the one or more files, determine device and browser information associated with the events, and determine a geographic location associated with the events.

Embodiments of the disclosed systems and methods provide real-time insight into discrepancies between disparate execution platforms. The systems and methods automatically ingest the reporting data into one discrepancy report and avoid the need to manually pull reports from various platforms. The systems and methods allow users to select their system of record and compare discrepancies between it and other vendors in one place. The systems and methods use a unique methodology by pulling log files from the execution platforms or measurement providers. The systems and methods provide a discrepancy report which includes an automatic calculation of the discrepancy for the user at the campaign and line level, and allows users to looks at various date ranges, rather than only campaign-to-date. The systems and methods provide a discrepancy report which is automatically calculated and presented in a manner that allows the user to easily see where there are potential issues. The systems and methods provide a mechanism by which, once the user sees or uncovers potential issues within the report, he or she can quickly adjust campaign settings directly within the system. The systems and methods provide a mechanism for easy access to discrepancy information, so as to allow for quick trouble-shooting, investigation, and campaign modification to improve efficiency and avoid waste.

Any combination and permutation of embodiments is envisioned. Other objects and features will become apparent from the following detailed description considered in conjunction with the accompanying drawings.

BRIEF DESCRIPTION OF DRAWINGS

The accompanying figures, which are incorporated in and constitute a part of this specification, illustrate one or more embodiments of the present disclosure and, together with the description, help to explain embodiments of the present disclosure. The embodiments are illustrated by way of example and should not be construed to limit the present disclosure. In the figures.

DETAILED DESCRIPTION

In accordance with embodiments of the present disclosure, each third party system of multiple third party systems can store files including datasets associated with one or more campaigns. A computing system can be in communication with the third party systems and including a first database and a second database. A user device including a display can be in communication with the computing system. The user device can be configured to transmit a selection of one or more third-party systems to the computing system. Each of the one more third-party systems is configured to store one or more files including datasets associated with at least one campaign.

The computing system can be configured to receive the selection of the one or more third-party systems, store metadata associated with the at least one campaign in the first database, generate a workflow for each third-party systems of the one or more third party systems, stream the one or more files including the datasets associated with the at least one campaign from each of the one or more third party systems, via each respective workflow, store the datasets associated with the at least one campaign from each of the one or more third party systems in the second database, calculate at least one discrepant data value between the one or more third party systems, based on the datasets associated with the at least one campaign from each of the one or more third party systems, and generate a graphical user interface including a report indicating the datasets associated with the at least one campaign from each third party system of the one or more third party systems and the at least one discrepant data value between the third party systems. The campaigns can be embodied as digital media campaigns. The data can be impressions, click counts, and viewable measureable impression counts. The third party systems can be embodied as vendors.

Figure 1:
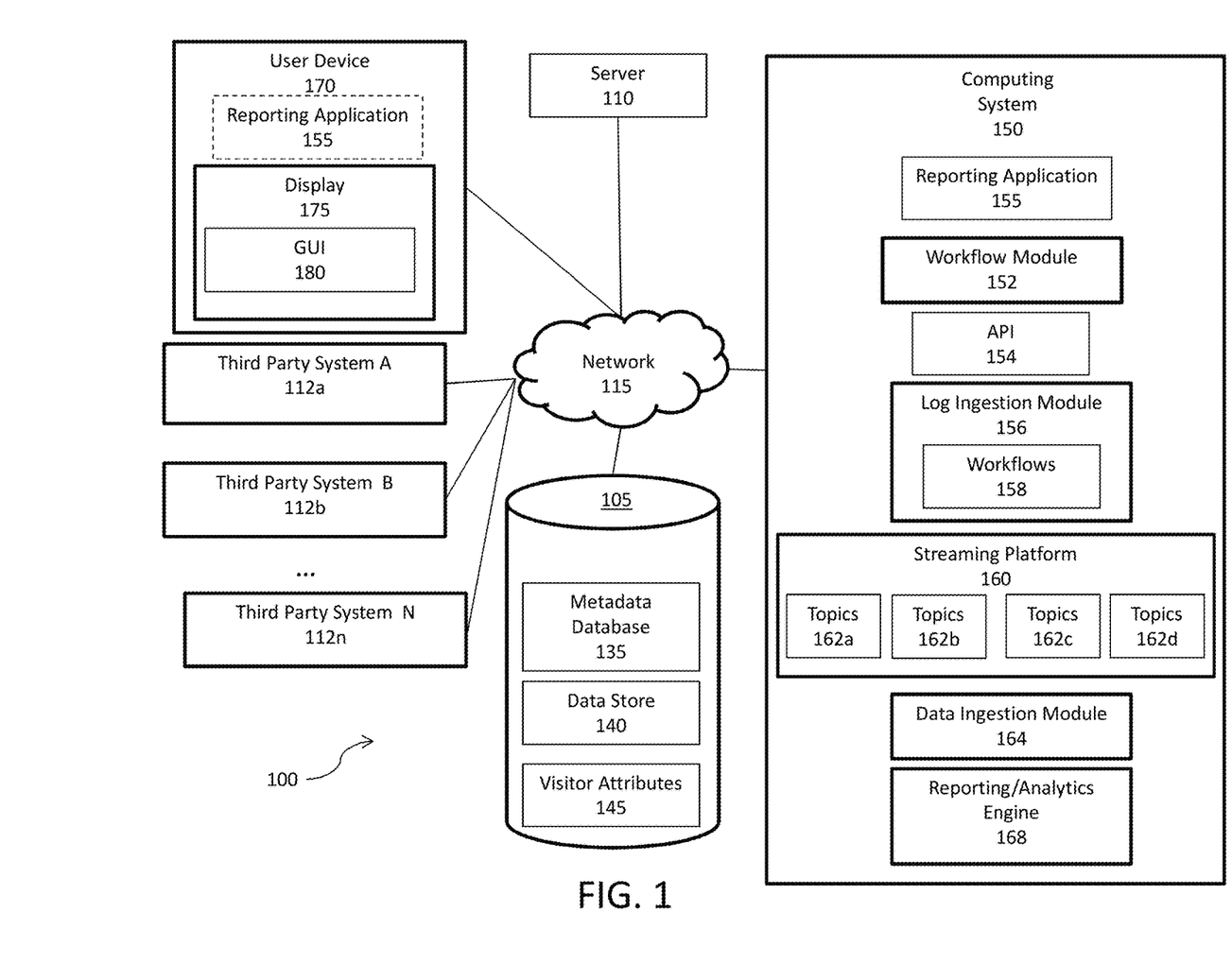
FIG. 1 is network diagram of a system to determine data discrepancies between disparate systems in real-time in accordance with and exemplary embodiment.

FIG. 1 is network diagram of a system 100 to determine data discrepancies between disparate systems in real-time in accordance with and exemplary embodiment. The system 100 to determine data discrepancies between disparate systems in real-time can include one or more data sources 105, one or more servers 110, one or more third party systems A-N 112*a-n*, one or more computing systems 150, and one or more user devices 170. The computing system 150 can be in communication with the data sources 105, server(s) 110, the third party systems A-N 112*a-n*, and the user devices 170, via a communications network 115.

The computing system 150 can execute a reporting application 155, workflow module 152, log ingestion module 156, data ingestion module 164, and a reporting/analytics engine 168 to implement the system 100 to determine data discrepancies between disparate systems in real-time. The computing system 150 can also include a streaming platform 160 and an Application Program Interface (API) service 154 to communicate with the streaming platform 160. The one or more user devices 170 can execute an instance of the reporting application 155, hosted by the computing system 150, and/or can interface with the computing system, which can execute an instance of the application on behalf of the one or more user devices 170. The one or more user devices 170 can include a display 175 for rendering a graphical user interface (GUI) 180.

In an example embodiment, one or more portions of the communications network 115, can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 110 includes one or more computers or processors configured to communicate with the computing system 150, third party systems A-N 112*a-n*, and user devices 170, via the communications network 115. The data sources 105 may store information/data, as described herein. For example, the data sources 105 can include multiple databases, including a metadata database 135, a data store database 140, and a visitor attributes database 145. The metadata database 135 can store metadata associated with campaigns. The data store database 140 can data associated with campaigns ingested from the third party systems A-N 112*a-n*. The visitor attribute database 145 can store data associated with data derived/calculated/determined during an enrichment process. The data sources 105 can be located at one or more geographically distributed locations from the computing system 150. Alternatively, the data sources 105 can be located at the same geographically as the computing system 150.

In one embodiment, the computing system 150 can receive a request to initiate a campaign and a selection of third party systems A-N 112*a-n*, from the user device 170. The computing system 150 can execute the workflow module 152 in response to receiving request to initiate a campaign and a selection of third party systems A-N 112*a-n*. The workflow module 152 can call the API service 154 to initiate a campaign setup, specifying the selection of third party systems A-N 112*a-n* to be included in the campaign as well as the metadata associated with the campaign.

The API service 152 can store the metadata associated with the campaign in the metadata database 135. As a non-limiting example, the metadata can include one or more of campaign ID, line ID, ad ID, and creative ID. The API service 152 can create workflows 158 in the log ingestion module 156 for each of the selected third party systems A-N 112a-n. Each of the workflows 158 can download files from each of the selected third party systems. The files can include can be impression/event-level logs associated with the campaign. Impressions can be embodied as a view or ad view referring to a point at which an ad is viewed by a user and/or displayed on a web page. The number of impressions of a particular campaign can be determined by the number of times a particular webpage with the advertisement is located and/or loaded. As an example, the files can be posted by the third party systems A-N 112a-n to a Secure File Transfer Protocol (SFTP), File Transfer Protocol (FTP), Google Cloud Storage, and/or Amazon Web Services (AWS) S3 bucket.

Each workflow 158 streams the downloaded files from the to a specific topic 162 in a streaming platform 160. In one embodiment, the topics 162 can be associated with a type of third party system A-N 112a-n. The workflows 158 can stream the files to the respective topics 162 based on the type of third party system A-N 112a-n the files were downloaded from. The data ingestion module 164 can execute an enrichment and/or an extract, transform, load (ETL) process on the files streamed in the different topics 162. The data ingestion module 164 can read the datasets in the log lines of the files from each respective topic, map the datasets from the log lines into fields of a common (normalized) format, transform the datasets, and load the datasets for storage in the data store database 140. The enrichment and ETL process will be described in further detail with respect to FIG. 3.

A unique transaction ID can be assigned to each dataset in each of third party system using tags disseminated by the computing system 150. The tags can be code (e.g., HTML) embedded in and assigned to datasets such as impressions, links, and/or other event level data associated with a particular campaign. The tags can identify types of datasets. For example, the tag can be a display tag, a video tag, creative tag, and/or a specialized tag. The unique transaction ID can be generated at execution of an impression. Tags will be described in further detail with respect to FIG. 4.

The reporting/analytics engine 168 can retrieve/read the datasets stored in the data store database 140. The reporting/analytics engine 168 can calculate the discrepant value, based on the datasets, between the third party systems A-N 112a-n. The discrepant value can be calculated as Discrepancy=(Vendor A Impressions−System of Record Impressions)/(Vendor A Impressions). The Discrepancy can represent the discrepant value and the Vendor A can represent an third party system (i.e., third party system A 112a). The reporting/analytics engine can generate a Discrepancy Report. The Discrepancy Report can include the datasets from each of the selected third party systems A-N 112a-n and the calculated discrepant value.

The reporting application 155 can generate a GUI 180 rendering the Discrepancy Report. The instance of the reporting application 155 executing on the user device 170 can render the GUI 180 on the display 175 of the user device.

As a non-limiting example, the system 100 to determine data discrepancies between disparate systems in real-time, can be implemented to determine discrepancies in tracking and billing of digital media ad campaigns. The third party systems A-N 112a-n can be vendors associated with a digital media ad campaign. The vendors can be one or more of a trackers, an ad server, an execution platform, and a measurement platform. The files received from vendors (i.e., third party systems A-N 112a-n) can include datasets associated with at least one of, trackers (a proprietary data source), cost data, measurement data, and ad server data. The trackers can track real-time events on digital media (e.g., the internet), such as click counts. In this regard, the files associated with the trackers can include event level data. The attributes associated with the real-time events on digital medial derived/calculated/determined during an enrichment process can be stored in the visitor attributes database 145. The user device 170 can be associated with a user implementing a digital media campaign. The user can be an entity such as a company, organization, corporation, partnership, individual, educational institution, and/or any other type of entity implementing digital media campaigns.

Figure 2:
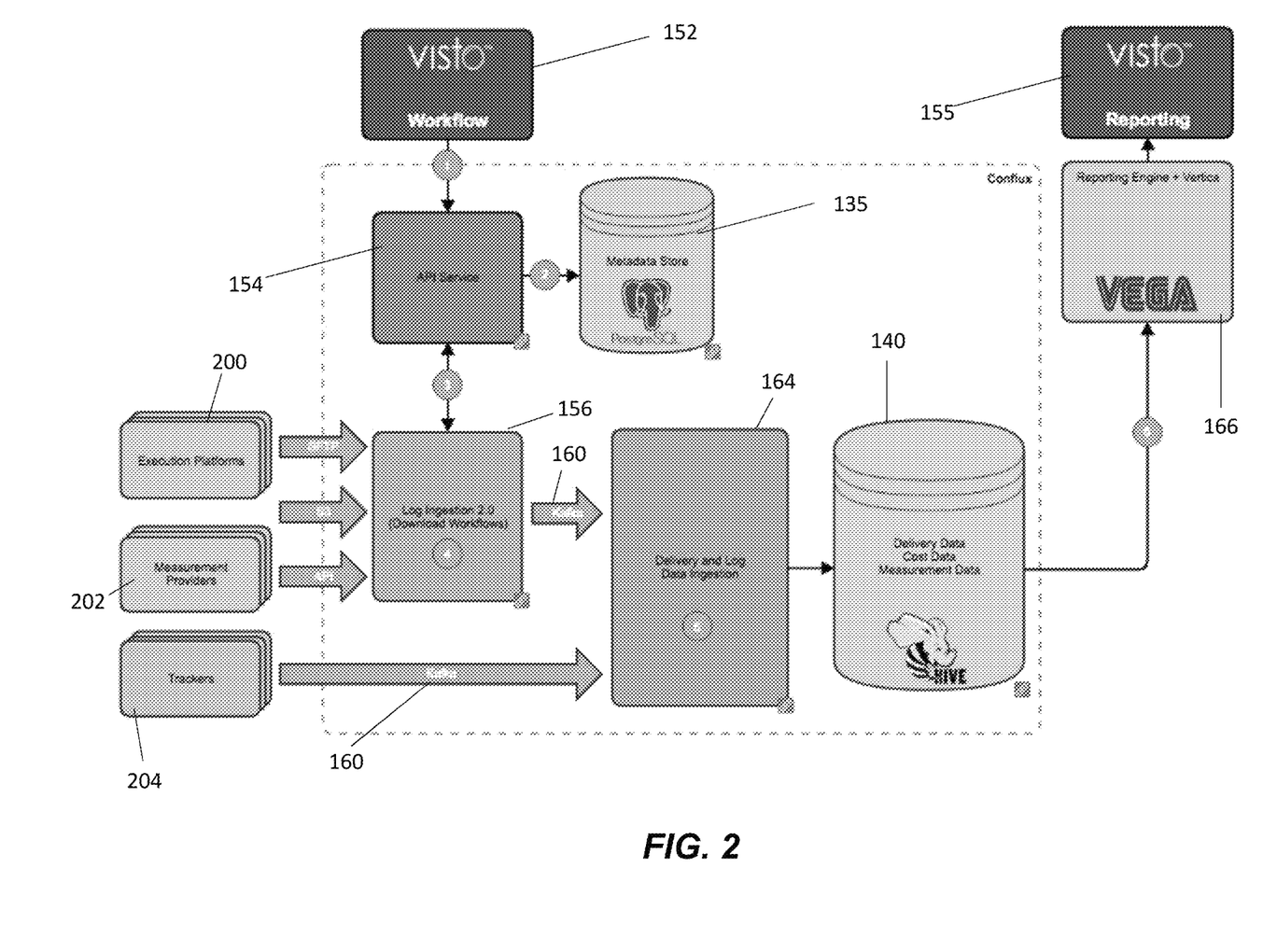
FIG. 2 illustrate an architecture for implementing the system to determine data discrepancies between disparate systems in real-time in accordance with and exemplary embodiment.

FIG. 2 illustrates an architecture 200 for implementing the system to determine data discrepancies between disparate systems in real-time in accordance with and exemplary embodiment. A workflow module 152 can API service 154 to initiate a campaign setup, specifying the specific vendors to be included in the campaign and on which vendor to execute the campaign buying, as well as credentials for each vendor. The vendor can be a third party system (e.g., third party system A-N 112a-n). As an example, the vendors can be execution platforms 200, measurement providers 202, and trackers 204. The workflow module 152 can be embodied as a Visto™ Workflow. The workflow module 152 can also provide the API service 154 metadata associated with the campaign. The API Service 154 can store metadata provided by workflow module 152 in a metadata database 135. The metadata database 135 can be embodied as a Postgres database.

The API Service 154 can create workflows in the log ingestion module 156. The log ingestion module 156 can be embodied as Conflux. The workflows can download files such as impression/event-level logs for each of the vendors used by the client. As an example, the execution platforms 200 and measurement providers 202 can post log files to an SFTP location, an FTP location, Google Cloud Storage, and/or AWS S3 bucket. The workflows can stream the files into topics in a streaming platform 160 such as Apache Kafka. Apache Kafka is a streaming platform which allows systems and users to subscribe and publish data to any number of systems and real-time applications. The data can be received by Apache Kafka and partitioned by topics. The topics can be specified. For example, the topics can be specified based on the type of dataset (i.e., trackers, cost data, measurement data, and/or ad server data). Trackers 204 can stream respective files directly to the streaming platform 160.

The data ingestion module 162 can receive the streamed files from the different topics from the streaming platform 160. The data ingestion module 162 can read the datasets in the log lines of the files from each respective topic, map the datasets from the log lines into fields of a common (normalized) format, transform the datasets, and load the datasets for storage in the data store database 140. The Data Ingestion module 162 also receives delivery events streamed by trackers 204, from the streaming platform 160, performs various enrichments to these events, and streams the events into HDFS/Hive. The data store database 140 can be embodied as Hadoop Distributed File System (HDFS)/Hive data warehouse.

A reporting/analytics engine 166 can include a reporting platform and an analytics platform. The reporting platform reads and/or retrieves the datasets from the data store database 140 and loads it into an analytics platform. The analytics platform can execute necessary aggregations to produce a discrepancy report. The reporting platform can be embodied as Vega and the analytics platform can be HPE Vertica. The analytics platform can provide the discrepancy report to a reporting application 155 to provide the discrepancy report to a user device (e.g., user device 170 as shown in FIG. 1). The reporting application 155 can be embodied as Visto™ Reporting.

Figure 3:
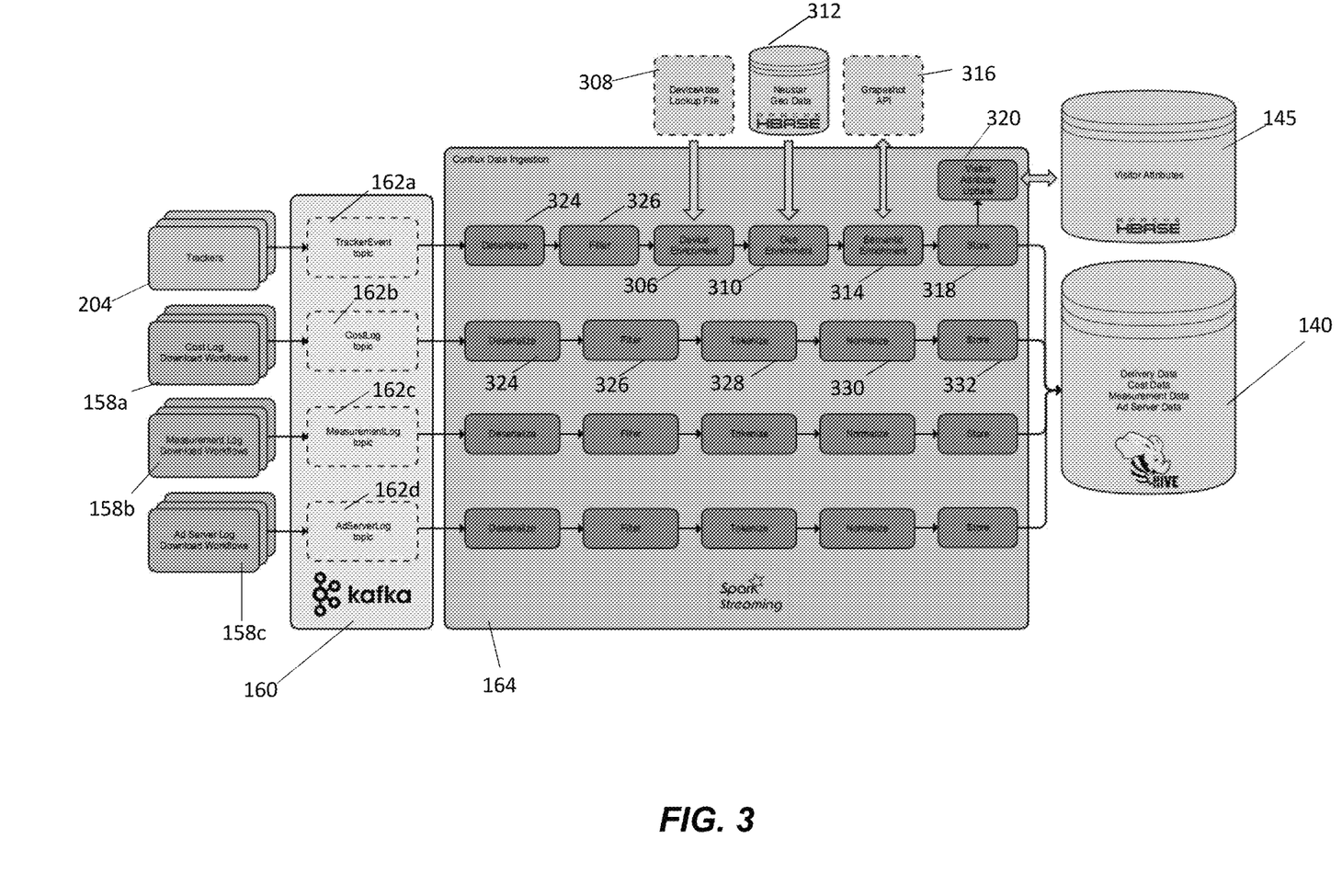
FIG. 3 illustrates an architecture for implementing the Delivery and Log Ingestion module in accordance to an exemplary embodiment.

FIG. 3 illustrates an architecture 300 for implementing the Delivery and Log Ingestion module in accordance to an exemplary embodiment. As described with respect to FIG. 2, impression/event-level log files are received from different third party systems (vendors) and is classified, based on the type of third party systems: Trackers (a proprietary data source), cost data, measurement data, and ad server data. Workflows are generated based on the type of dataset and/or third party system. As an example, a cost log download workflow 158a, a measurement log download workflow 158b, and an ad server log download workflow 158c, can be created. As also described with respect to FIG. 2, files are posted by the third party systems to an SFTP location, an FTP location, Google Cloud Storage, and/or an AWS S3 bucket. The files are downloaded from the respective locations and streamed to a streaming platform 160 (i.e., Apache Kafka). The streaming platform 160 can convert the files into a Java stream. The Java stream can be loaded into a streaming application on used by the data ingestion module 164, such as Conflux spark. Files including event level datasets can be streamed from trackers 204 to the streaming platform 160.

The streaming platform 160 can partition the incoming files by topics. As shown in FIG. 3, the trackers 204 can stream files including event level data to the trackers topic 162a, cost log download workflow 158a can stream cost log files into the cost log topic 162b, the measurement log download workflow 158b can stream the measurement log files to the measurement log topic 162c, and the ad server download workflow 158c can stream the ad server log files to the ad server log topic 162d. In response to being loaded into the data ingestion module 164, the data ingestion module 164 can execute the ETL process, the cost log files, measurement log files, and the ad server log files.

The ETL process can include a deserialization operation 324, a filtering operation 326, a tokenization operation 328, a normalization operation 330, and a store operation 332. In the deserialization operation 324 the datasets in the cost log, measurement log, and ad server files is broken down to extract the raw data from the files and create new objects. In the filtering operation 326, the datasets and/or event level data that do not have a valid transaction ID can be removed. The transaction ID can be a unique ID generated at the execution of an impression that is disseminated to the third party systems through a tag. Tags will be described in further detail with respect to FIG. 4. In the filtering operation 326, datasets associated with any impression that is flagged as having been served to an IP address marked by the IAB Bots and Spiders List as non-human traffic, can be removed.

In the tokenization operation 328, the datasets from different data sources (i.e., different data sources across all third party systems) can be joined based on the transaction ID associated with each of the datasets. The datasets associated impression event records from different third party systems can be matched. The data points passed from each third party system can be broken down into distinct objects so the datasets can be reassembled into a coherent dataset. In the normalization operation 330, the datasets from the different third party systems can be reassembled into a Visto™ data format (columns) that allows for creation of a readable dataset combining data from all third party systems. In the store operation 332, the reassembled datasets are prepared and stored in the data store database 140 (i.e., Hive data warehouse).

The data ingestion module 160 can execute an enrichment process on the event level data streamed through the trackers 204. The enrichment process can include a deserialization operation 324, a filtering operation 326, a device enrichment operation 306, a geographic (geo) enrichment operation 310, a semantic enrichment operation 314, and a store operation 318. The deserialization operation 324, and filtering operation 326, can be executed as described above with respect to the ETL process. In the device enrichment process 306, the device and (internet) browser data associated with the event level data can be determined based on a user agent from the (internet) browser associated with the event level data, using a file provided by a DeviceAtlas source 308. The DeviceAtlas source can be used to analyze web traffic device detection. The DeviceAtlas source is a platform configured to provide data on all mobile and connected devices including smartphones, tablets, laptops, and wearable devices. It can be appreciated sources other than the DeviceAtlas source can be used to provide the same data.

In the geographic enrichment operation 310, IP addresses of the user viewing the impression event associated with the event level data can be extracted. A file provided by a source such as Neustar 312 can be used to look up the geographic location of the IP address. Neustar 312 is a platform that can provide real-time information and analytics. It can be appreciated sources other than the Neustar 312 can be used to provide the same data.

In the semantic enrichment operation 314, a Uniform Resource Locator (URL) from a website of the impression event associated with the event level data is captured and transmitted to a context marketing engine 316 such as Grapeshot. The context marketing engine can return a specified number (i.e., top five) classification (in IAB categories) for the website. Grapeshot is a platform to segment inventory and improve target marketing. It can be appreciated sources other than the Grapeshot can be used to provide the same data.

In the store operation 318, the resultant data from the deserialization operation 324, filtering operation 326, device enrichment operation 306, geographic (geo) enrichment operation 310, and semantic enrichment operation 314 can be stored in the data store database 140. Additionally, the resultant data from the device enrichment operation 306, geographic (geo) enrichment operation 310, and semantic enrichment operation 314 can be stored as user attribute data in the visitor attribute database 145.

In one embodiment, the system ingests datasets from files, from different impression-level and aggregated streams. Such datasets can come directly from each vendor involved in serving or measuring an impression. Once the data is ingested, an ETL process is executed to join data together based on a transaction ID passed to each vendor via creative tags.

Figure 4:
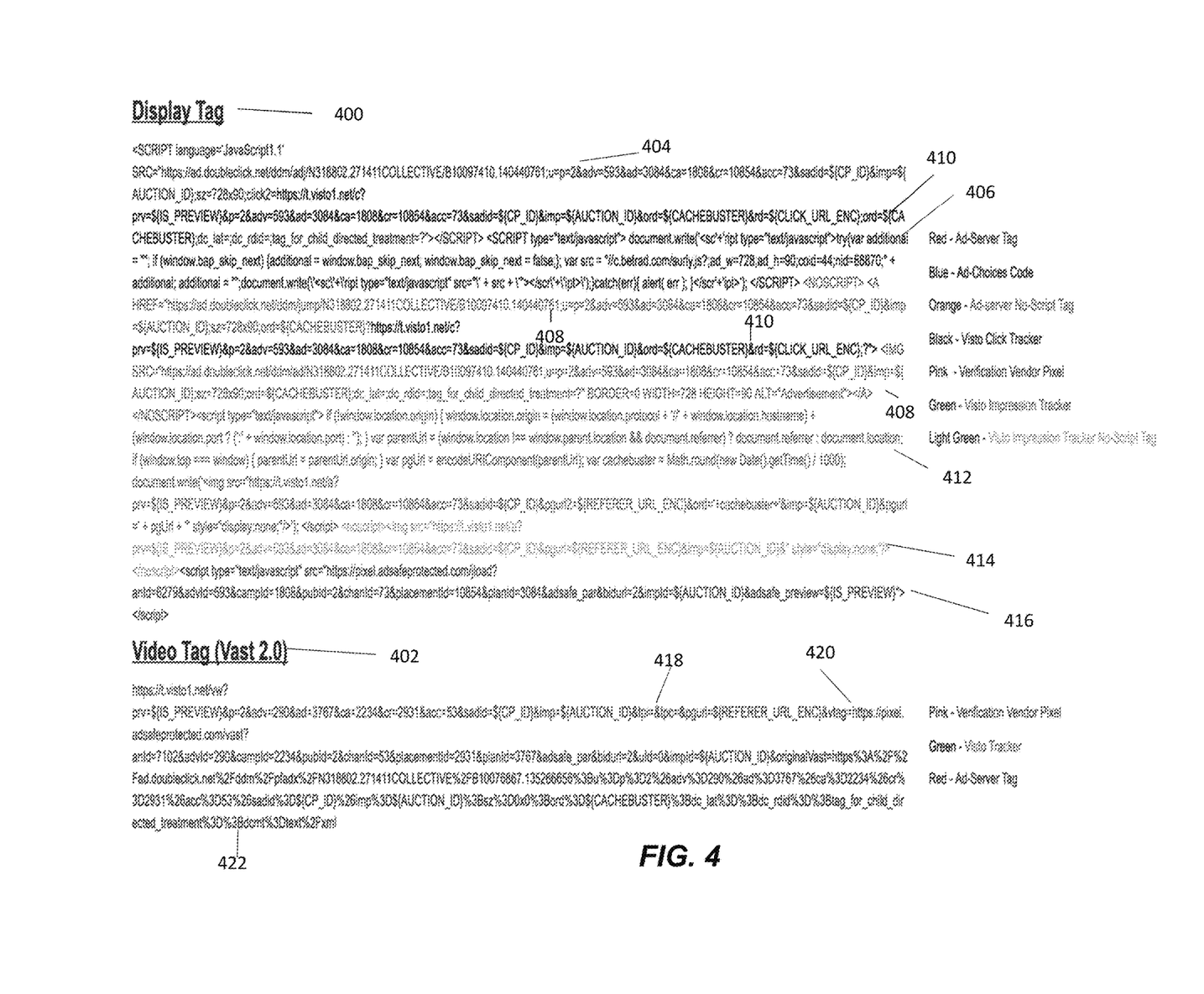
FIG. 4 illustrates tags which can be applied while implementing the system to determine data discrepancies between disparate systems in real-time in accordance with and exemplary embodiment.

FIG. 4 illustrates tags which can be applied while implementing the system to determine data discrepancies between disparate systems in real-time in accordance with and exemplary embodiment. In one embodiment, one or more specialized tag(s) is/are applied to leverage functionality of existing ad servers, to provide the ability to incorporate reporting benefits offered by adding tracking URLs from multiple third party systems (vendors) involved in the ad delivery and management process (ad servers, measurement partners, etc.). In this regard, the system is able to generate a unified reporting experience (i.e., the discrepancy report)

that combines the authoritative ad server data with quality information provided by a verification/measurement provider, real-time feedback provided by a tracking module, and information obtained from other third party systems participating in the digital media campaign (such as an execution partner). In one embodiment, tags are customized to produce a combination of URLs, custom parameters, and macros for each possible group of vendors leveraged on a campaign.

As an example, a display tag 400 and a video tag 402 can be applied by the disclosed system. The display tag 400 and video tag 402 demonstrate various parameters and URLs/trackers that can be assembled using the techniques described herein. The code 404 and 408 under the display tag 400, references the original ad tag provided by the ad server. The code 412 and code 414 under the display tag 400 references the impression tracking mechanism from the Visto™ tracker. The code 410 under the display tag 400 references the click-tracking mechanism from the Visto™ tracker. The codes 412, 414, and 410 can be added automatically during the tag assembly process. The code 416 under the display tag 400 references optional tracking mechanisms for verification or ad quality measurement vendors for the purpose of tracking and comparing impression management. The code 406 under the display tag 400 references ad-choices code.

The code 418 under the video tag 402 references a tracking mechanism from the Visto™ Tracker. The code 420 under the video tag 402 references optional tracking mechanisms for verification or ad quality measurement vendors for the purpose of tracking and comparing impression management. The code 422 under the video tag 402 references the original ad tag provided by the ad server. One skilled in the art will recognize that these are merely examples, and that other types of tags can be used, provided, and/or applied.

Data from the respective third party systems (vendors), such as impression and click counts, viewable and measurable impression counts, etc., is then combined with the metadata such as campaign ID, line ID, ad ID and creative ID, that has been stored about campaigns in the metadata database (e.g., metadata database 135 as shown in FIGS. 1-2). Information on each third party system which is applied to each impression can be stored. Data associated with each third party system involved in a campaign (i.e., digital media campaign) that needs to be applied on an impression can also be stored. The combination of each creative and ad is stored. This data is surfaced and made available within the discrepancy report (for example, as part of a pre-built "Performance Report"). A discrepancy calculation is automatically applied to the data to make it readily available to users.

Figure 5:
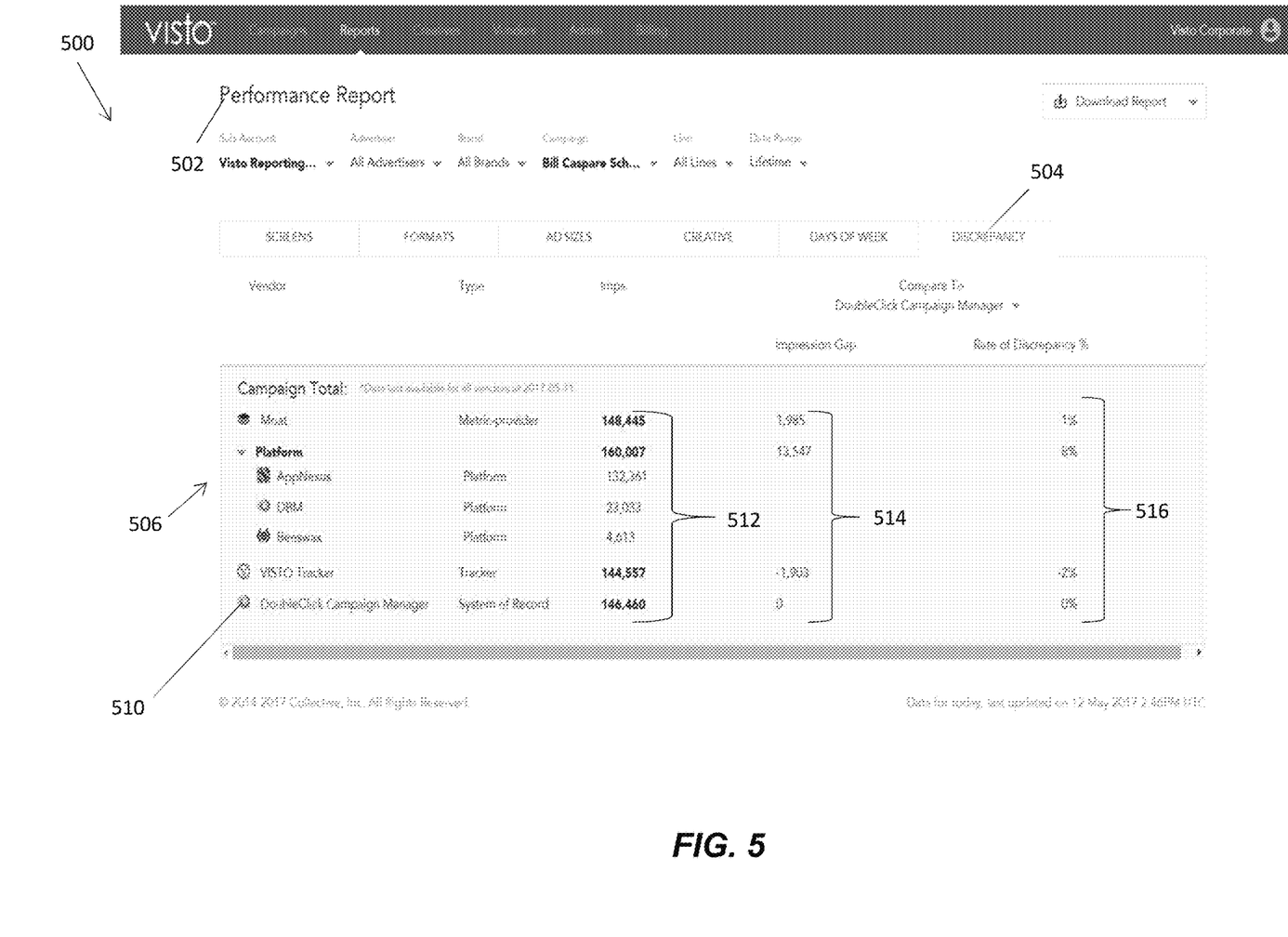
FIG. 5 illustrates a discrepancy report rendered on an exemplary Graphical User Interface (GUI) in accordance with an exemplary embodiment.

FIG. 5 illustrates a discrepancy report 504 rendered on an exemplary Graphical User Interface (GUI) 500 in accordance with an exemplary embodiment. The discrepancy report 504 can be included in a performance report 502. For each third party system 506, the number of recorded/delivered impressions 512 for the date range in question can be displayed. A user can choose to compare the recorded impression delivery figures 514 to the system of record 510, ad server, execution platform, and/or measurement partner (i.e., third party systems 506). The impression gap FIG. 514 represents the difference in recorded/delivered impressions between each of the third party systems 506 and the system of record 510. The rate of discrepancy % FIG. 516 indicates the impression gap as a percentage of total impressions.

The Discrepancy Report allows users to easily identify discrepancies across various vendors included in the digital media campaign, and to make campaign adjustments so as to ensure full campaign delivery and minimal negative impact to company margin (by either troubleshooting any technical issues causing a discrepancy, or by shifting budget away from parties generating large and unacceptable impression discrepancies, such as those exceeding 10%).

Figure 6:
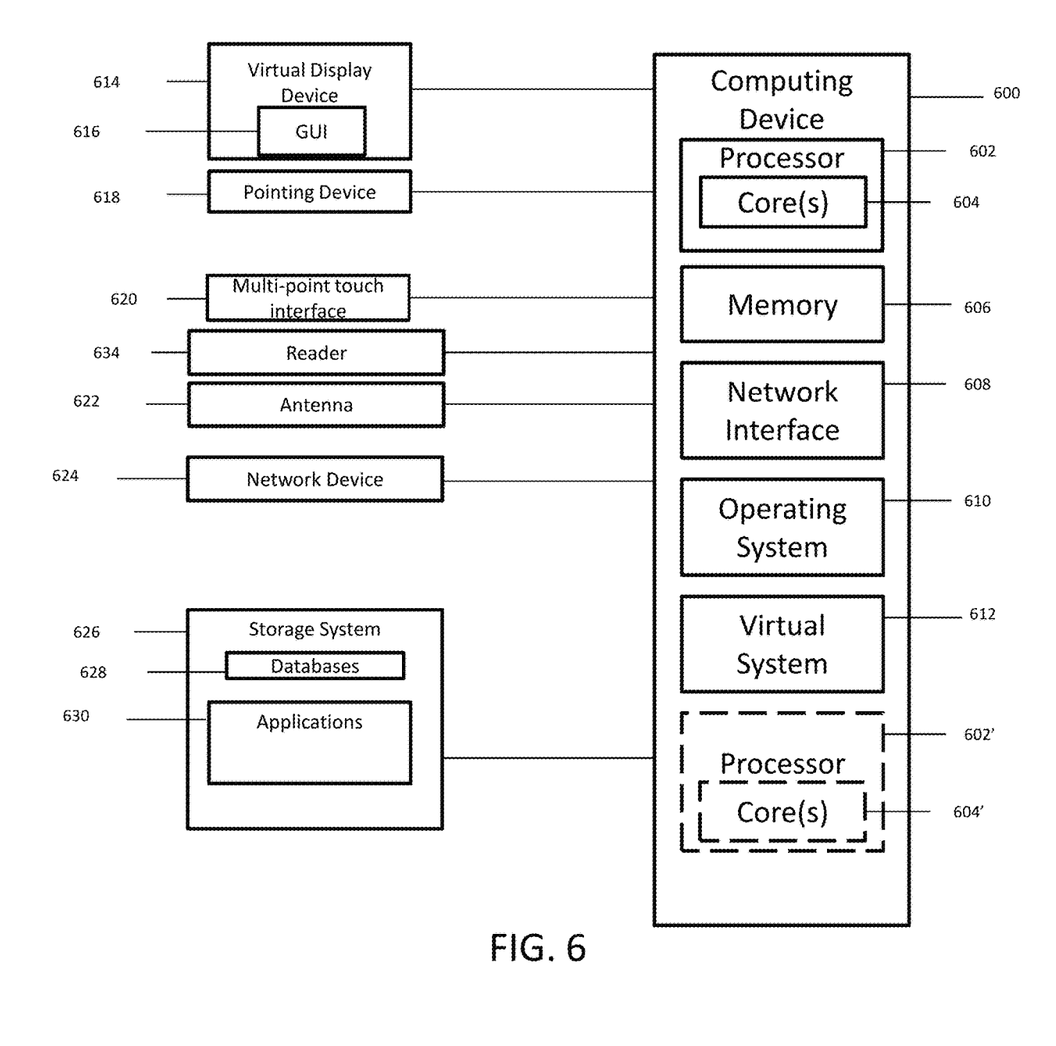
FIG. 6 illustrates a computing device in accordance with an exemplary embodiment.

FIG. 6 is a block diagram of an example computing device for implementing exemplary embodiments. The computing device 600 may be, but is not limited to, a smartphone, laptop, tablet, desktop computer, server or network appliance. The computing device 600 can be embodied as part of the computing system, user device and/or third party systems. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 606 included in the computing device 600 may store computer-readable and computer-executable instructions or software (e.g., applications 630 such as the reporting application 155, workflow module 152, API service 154, log ingestion module 156, streaming platform 160, data ingestion module 164, and reporting analytics engine 168) for implementing exemplary operations of the computing device 600. The computing device 600 also includes configurable and/or programmable processor 602 and associated core(s) 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for implementing exemplary embodiments. Processor 602 and processor(s) 602' may each be a single core processor or multiple core (604 and 604') processor. Either or both of processor 602 and processor(s) 602' may be configured to execute one or more of the instructions described in connection with computing device 600.

Virtualization may be employed in the computing device 600 so that infrastructure and resources in the computing device 600 may be shared dynamically. A virtual system 612 may be provided to handle a process running on multiple processors so that the process appears to be using only one computing resource rather than multiple computing resources. Multiple virtual machines may also be used with one processor.

Memory 606 may include a computer system memory or random access memory, such as DRAM, SRAM, EDO RAM, and the like. Memory 606 may include other types of memory as well, or combinations thereof.

A user may interact with the computing device 600 through a visual display device 614, such as a computer monitor, which may display one or more graphical user interfaces 616, multi touch interface 620, and a pointing device 618.

The computing device 600 may also include one or more storage devices 626, such as a hard-drive, CD-ROM, or other computer readable media, for storing data and computer-readable instructions and/or software that implement exemplary embodiments (e.g., applications). For example, exemplary storage device 626 can include one or more databases 628 for storing data values for metadata, data extracted from third party systems associated to campaigns, and visitor attribute data. The databases 628 may be updated manually or automatically at any suitable time to add, delete, and/or update one or more data items in the databases.

The computing device 600 can include a network interface 608 configured to interface via one or more network devices 624 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 622 to facilitate wireless communication (e.g., via the network interface) between the computing device 600 and a network and/or between the computing device 600 and other computing devices. The network interface 608 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

The computing device 600 may run operating system 610, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 600 and performing the operations described herein. In exemplary embodiments, the operating system 610 may be run in native mode or emulated mode. In an exemplary embodiment, the operating system 610 may be run on one or more cloud machine instances.

Figure 7:
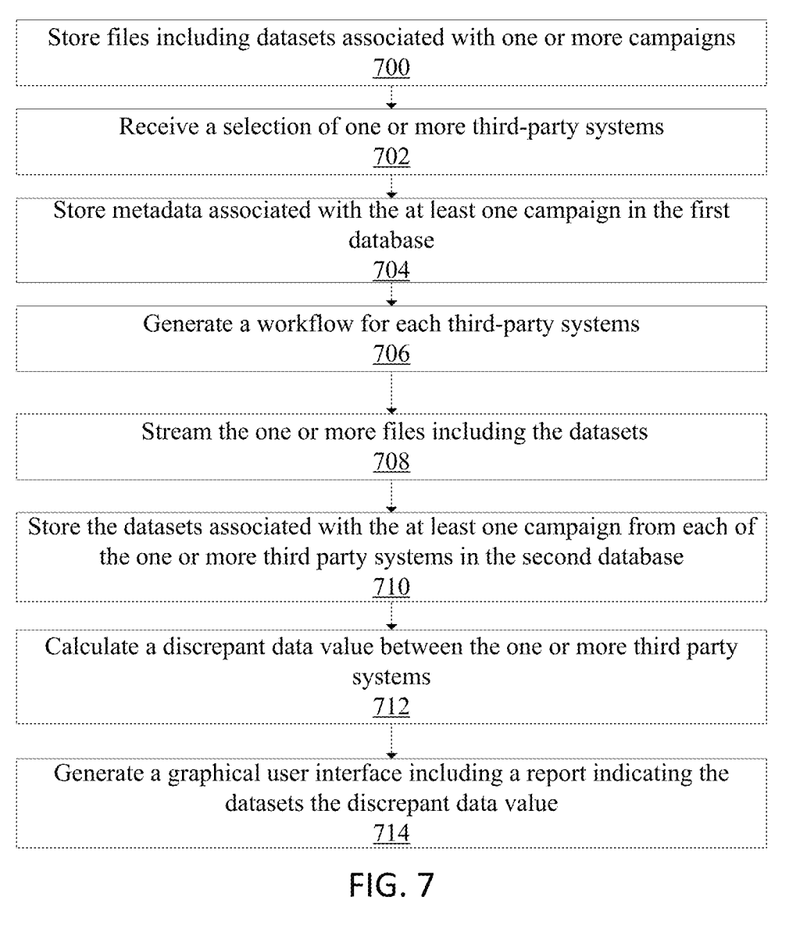
FIGS. 7-9 are flowcharts illustrating an exemplary process performed in an embodiment of the system to determine data discrepancies between disparate systems in real-time according to an exemplary embodiment.

FIG. 7 is a flowchart illustrating an exemplary process performed in the system for determining data discrepancies between disparate systems in real-time. In operation, 700, each of multiple third party systems (e.g., third party systems A-N 112a-n as shown in FIG. 1) can store files including datasets associated with one or more campaigns. In operation 702, a computing system (e.g., computing system 150 as shown in FIG. 1) in communication with the third party systems, a user device (e.g., user device 170 as shown in FIG. 1) and including a first database (e.g., metadata database 135 as shown in FIGS. 1-2) and a second database (data store database 140 as shown in FIGS. 1-3), can receive a selection of one or more third-party systems from the user device. Each of the one more third-party systems is configured to store one or more files including datasets associated with at least one campaign.

In operation 704, the computing system can store metadata associated with the at least one campaign in the first database. In operation 706 the computing system can generate a workflow (e.g., workflows 162 as shown in FIG. 1) for each third-party systems of the one or more third party systems. In operation 708, the computing system can stream the one or more files including the datasets associated with the at least one campaign from each of the one or more third party systems, via each respective workflow. In operation 710, the computing system can store the datasets associated with the at least one campaign from each of the one or more third party systems in the second database. In operation 712 the computing system can calculate a discrepant data value between the one or more third party systems, based on the datasets associated with the at least one campaign from each of the one or more third party systems. In operation 714, the computing system can generate a graphical user interface including a report indicating the datasets associated with the at least one campaign from each third party system of the one or more third party systems and the at least one discrepant data value between the third party systems.

Figure 8:
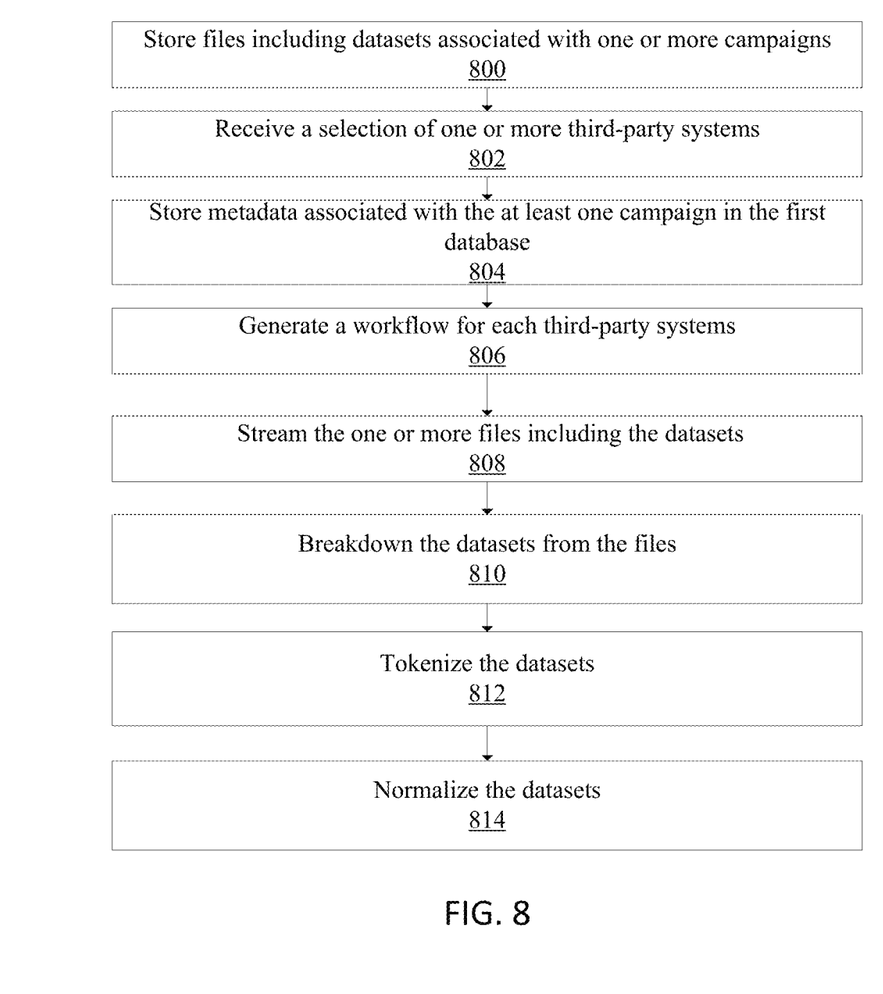

FIG. 8 is a flowchart illustrating an exemplary process performed in the system for determining data discrepancies between disparate systems in real-time. In operation, 800, each of multiple third party systems (e.g., third party systems A-N 112a-n as shown in FIG. 1) can store files including datasets associated with one or more campaigns. In operation 802, a computing system (e.g., computing system 150 as shown in FIG. 1) in communication with the third party systems, a user device (e.g., user device 170 as shown in FIG. 1) and including a first database (e.g., metadata database 135 as shown in FIGS. 1-2) and a second database (data store database 140 as shown in FIGS. 1-3), can receive a selection of one or more third-party systems from the user device. Each of the one more third-party systems is configured to store one or more files including datasets associated with at least one campaign.

In operation 804, the computing system can store metadata associated with the at least one campaign in the first database. In operation 806 the computing system can generate a workflow (e.g., workflows 162 as shown in FIG. 1) for each third-party systems of the one or more third party systems. In operation 808, the computing system can stream the one or more files including the datasets associated with the at least one campaign from each of the one or more third party systems, via each respective workflow.

In operation 810, the computing system can breakdown the datasets from the files. In operation 812, the computing system can filter the datasets by removing any dataset associated with an invalid transaction ID. The transaction ID can be a unique ID generated for the dataset based on a one or more tags applied to each of the plurality of third-party systems. In operation 814, the computing system can tokenize the datasets by joining the datasets based on transaction ID. In operation 816, the computing system can normalize the datasets.

Figure 9:
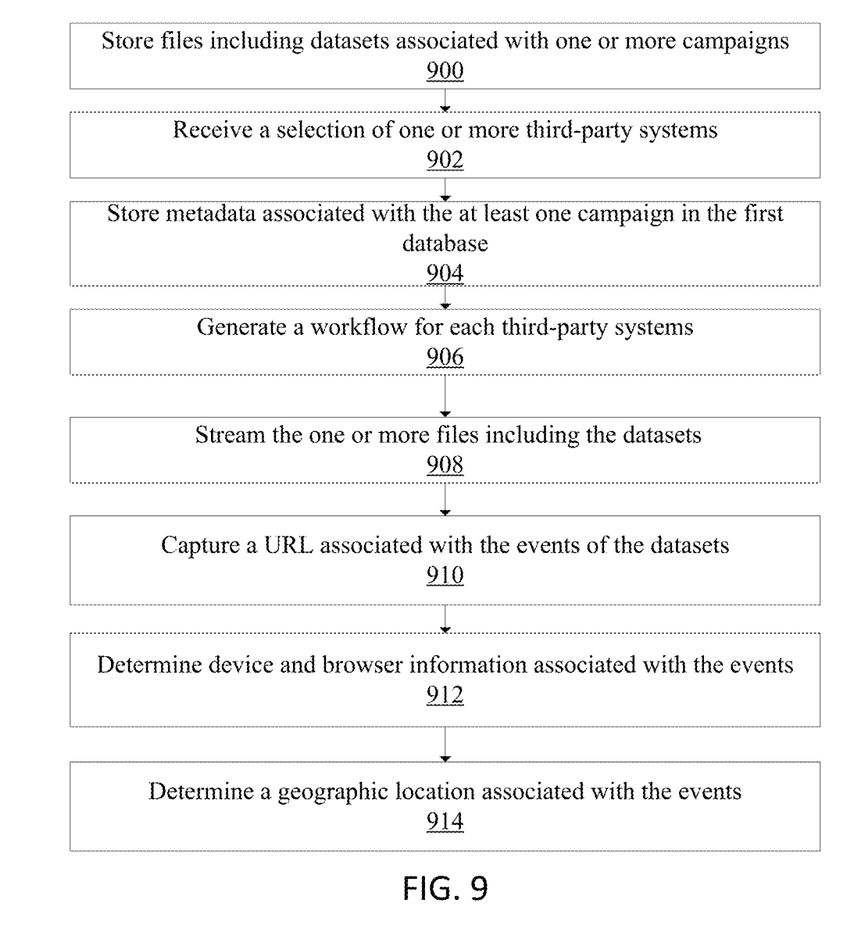

FIG. 9 is a flowchart illustrating an exemplary process performed in the system for determining data discrepancies between disparate systems in real-time. In operation, 900, each of multiple third party systems (e.g., third party systems A-N 112a-n as shown in FIG. 1) can store files including datasets associated with one or more campaigns. In operation 902, a computing system (e.g., computing system 150 as shown in FIG. 1) in communication with the third party systems, a user device (e.g., user device 170 as shown in FIG. 1) and including a first database (e.g., metadata database 135 as shown in FIGS. 1-2) and a second database (data store database 140 as shown in FIGS. 1-3), can receive a selection of one or more third-party systems from the user device. Each of the one more third-party systems is configured to store one or more files including datasets associated with at least one campaign.

In operation 904, the computing system can store metadata associated with the at least one campaign in the first database. In operation 906 the computing system can generate a workflow (e.g., workflows 162 as shown in FIG. 1) for each third-party systems of the one or more third party systems. In operation 908, the computing system can stream the one or more files including the datasets associated with the at least one campaign from each of the one or more third party systems, via each respective workflow.

In operation 910, the computing system can capture a URL associated with the events of the datasets from the at least one of the one or more files. In operation 912, the computing system can determine device and browser information associated with the events. In operation 914, the computing system can determine a geographic location associated with the events.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system to determine data discrepancies between disparate systems in real-time, the system in communication with a plurality of third party systems and including a first database and a second database, the plurality of third party systems configured to store a plurality of files including datasets associated with one or more campaigns, the plurality of third party systems including an ad server and a measurement server; the system comprising:
   one or more processors; and
   one or more computer-readable mediums storing instructions that, when executed by the one or more computer processors, cause the system to perform operations comprising:
   receiving, from a user device, a user-selected date range and a user-selection of a plurality of third party systems, each of the third-party systems configured to store one or more files of the plurality of files, including datasets associated with at least one campaign of the one or more campaigns, the datasets associated with the least one campaign include one dataset from the ad server and one dataset from the measurement server for a same campaign, the dataset from the measurement server collected via applying a second tag to an advertisement code referencing a first tag from the ad server,
   storing metadata associated with the at least one of the campaigns in the first database,
   generating a workflow for each third-party system,
   streaming the one or more files including the datasets associated with the at least one campaign from each of the third party systems, via each respective workflow,
   storing the datasets associated with the at least one campaign from each of third party systems in the second database,
   calculating at least one discrepant data value between the third party systems within the user-selected date range, based on the datasets associated with one of the campaigns between the third party systems, and
   generating a graphical user interface including a report indicating the datasets associated with the campaign from each third party system and the at least one discrepant data value between the third party systems within the user-selected date range for the campaign.

2. The system of claim 1, wherein the datasets included in the plurality of files further includes one or more types of datum.

3. The system of claim 2, wherein the operations further comprising streaming each of the one or more files of the plurality of files to at least one topic of a plurality of topics based on the one or more types of datum in the datasets included in the one or more files.

4. The system of claim 1, wherein the operations further comprise:
   breaking down the datasets from the one or more files;
   filtering the datasets;
   tokenizing the datasets; and
   normalizing the datasets.

5. The system of claim 4, wherein the operations further comprise:
   applying one or more tags to each of the plurality of third-party systems; and
   generating one or more unique transaction IDs based on based on the one or more tags applied to each of the plurality of third-party systems;
   associating the one or more transaction IDs with the datasets.

6. The system of claim 5, wherein tokenizing datasets includes joining the datasets based on the one or more transaction IDs.

7. The system of claim 5, wherein filtering the datasets includes removing at least one dataset associated with an invalid transaction ID.

8. The system of claim 1, wherein at least one of the one or more files includes datasets associated with events.

9. The system of claim 8, wherein the operations further comprise: capturing a URL associated with the events of the datasets from the at least one of the one or more files;
   determining device and browser information associated with the events; and
   determining a geographic location associated with the events.

10. The system of claim 1, wherein the graphical user interface is rendered on a display of the user device.

11. A method to determine data discrepancies between disparate systems in real-time, the method comprising:
    receiving, via a computing system processor, in communication with a plurality of third party systems and a user device and including a first database and a second database, a selection of a user-selected date range and the plurality of third party systems from the user device, each of the third-party systems configured to store a plurality of files including datasets associated with one or more campaigns, including datasets associated with at least one campaign of the one or more campaigns the plurality of third party systems including an ad server and a measurement server;

storing, via the computing system processor, metadata associated with the at least one campaign in the first database, generating, via the computing system processor, a workflow for each third-party systems, streaming, via the computing system processor, the one or more files including the datasets associated with the at least one campaign from each of the third party systems, via each respective workflow, the datasets associated with the least one campaign include one dataset from the ad server and one dataset from the measurement server for a same campaign, the dataset from the measurement server collected via applying a second tag to an advertisement code referencing a first tag from the ad server, storing, via the computing system processor, the datasets associated with the at least one campaign from each of the third party systems in the second database, calculating, via the computing system processor, at least one discrepant data value between the third party systems, based on the datasets associated with one of the campaigns across the third party systems and the user-selected date range, and generating, via the computing system processor, a graphical user interface including a report indicating the datasets associated with the at least one campaign from each third party system and the at least one discrepant data value between the third party systems over the user-selected date range.

12. The method of claim 11, wherein the datasets included in the plurality of files further includes one or more types of datum.

13. The method of claim 12, further comprising streaming with the processor, each of the one or more files of the plurality of files to at least one topic of a plurality of topics based on the one or more types of datum in the datasets included in the one or more files.

14. The method of claim 11, further comprising:
breaking down, via the computing system processor, the datasets from the one or more files;
filtering, via the computing system processor, the datasets;
tokenizing, via the computing system processor, the datasets; and
normalizing, via the computing system processor, the datasets.

15. The method of claim 14, further comprising:
applying, via the computing system processor, one or more tags to each of the plurality of third party systems; and
generating, via the computing system processor, one or more unique transaction IDs based on based on the one or more tags applied to each of the plurality of third-party systems;
associating, via the computing system processor, the one or more transaction IDs with the datasets.

16. The method of claim 15, further comprising tokenizing, via the computing system processor, datasets by joining the datasets based on the one or more transaction IDs.

17. The method of claim 15, further comprising filtering, via the computing system processor, the datasets by removing at least one dataset associated with an invalid transaction ID.

18. The method of claim 11, wherein at least one of the one or more files includes datasets associated with events.

19. The method of claim 18, further comprising:
capturing, via the computing system processor, a URL associated with the events of the datasets from the at least one of the one or more files;
determining, via the computing system processor, device and browser information associated with the events; and
determining, via the computing system processor, a geographic location associated with the events.

20. A non-transitory computer readable medium storing instruction to determine data discrepancies between disparate systems in real-time, that, when executed by one or more computer processors of a computing system, cause the computer to perform operations comprising:
receive, via the computing system, in communication with a plurality of third party systems, a user device and including a first database and a second database, a selection of a user-selected date range and the plurality of third party systems from the user device, each of the third-party systems configured to store a plurality of files including datasets associated with one or more campaigns, including datasets associated with at least one campaign of the one or more campaigns, the plurality of third party systems including an ad server and a measurement server;
store, via the computing system, metadata associated with the campaigns in the first database,
generate, via the computing system, a workflow for each third-party,
stream, via the computing system, the one or more files including the datasets associated with the at least one campaign from each of the third party systems, via each respective workflow, the datasets associated with the least one campaign include one dataset from the ad server and one dataset from the measurement server for a same campaign, the dataset from the measurement server collected via applying a second tag to an advertisement code referencing a first tag from the ad server,
store, via the computing system, the datasets associated with the at least one campaign from each of the third party systems in the second database,
calculate, via the computing system, at least one discrepant data value between the third party systems across a single campaign, based on the datasets associated with the campaign from each of the third party systems and the user-selected date range, and
generate, via the computing system, a graphical user interface including a report indicating the datasets associated with the at least one campaign from each third party system and the at least one discrepant data value between the third party systems for the single campaign over the user-selected date range.

* * * * *

UNITED STATES PATENT AND TRADEMARK OFFICE
CERTIFICATE OF CORRECTION

PATENT NO. : 11,599,521 B2
APPLICATION NO. : 15/988818
DATED : March 7, 2023
INVENTOR(S) : Reim et al.

Page 1 of 2

It is certified that error appears in the above-identified patent and that said Letters Patent is hereby corrected as shown below:

On the Title Page

In item (72), in "Inventors", in Column 1, Line 3, delete "Herzog Kirchgessner," and insert --Herzog,-- therefor In the Specification In Column 2, Lines 22-23, delete "based on based on" and insert --based on-- therefor In Column 4, Line 64, delete "152" and insert --154-- therefor In Column 5, Line 1, delete "152" and insert --154-- therefor In Column 6, Line 49, delete "162" and insert --164-- therefor In Column 6, Line 51, delete "162" and insert --164-- therefor In Column 6, Line 56, delete "162" and insert --164-- therefor In Column 7, Line 35, after "server", insert --log-- therefor In Column 8, Line 4, delete "160" and insert --164-- therefor In Column 8, Line 10, delete "318." and insert --332.-- therefor In Column 8, Line 41, delete "318." and insert --332.-- therefor In Column 10, Line 27, delete "reporting analytics" and insert --reporting/analytics-- therefor In Column 10, Line 58, delete "multi touch" and insert --multi-point touch-- therefor Signed and Sealed this
Fifteenth Day of October, 2024

Katherine Kelly Vidal
*Director of the United States Patent and Trademark Office*

CERTIFICATE OF CORRECTION (continued)
U.S. Pat. No. 11,599,521 B2

In Column 11, Line 56, delete "162" and insert --158-- therefor

In Column 12, Line 27, delete "162" and insert --158-- therefor

In Column 12, Line 62, delete "162" and insert --158-- therefor

In the Claims

In Column 14, Lines 32-33, in Claim 5, delete "based on based on" and insert --based on-- therefor In Column 14, Line 47, in Claim 9, after "comprise:", insert a linebreak In Column 14, Line 66, in Claim 11, after "campaigns", insert --,--

In Column 15, Line 52, in Claim 15, delete "based on based on" and insert --based on-- therefor In Column 16, Line 16, in Claim 20, delete "computer readable" and insert --computer-readable-- therefor